US006601688B1

(12) United States Patent
Stöxen

(10) Patent No.: US 6,601,688 B1
(45) Date of Patent: Aug. 5, 2003

(54) PASSENGER CONVEYOR GAP MONITORING DEVICE

(75) Inventor: Oliver Stöxen, Seelze (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/111,142

(22) PCT Filed: Oct. 13, 2000

(86) PCT No.: PCT/US00/28309

§ 371 (c)(1),
(2), (4) Date: Jul. 24, 2002

(87) PCT Pub. No.: WO01/28912

PCT Pub. Date: Apr. 26, 2001

(30) Foreign Application Priority Data

Oct. 21, 1999 (DE) ........................................ 199 50 868

(51) Int. Cl.[7] ................................................ B65G 43/00
(52) U.S. Cl. ........................ 198/323; 198/322; 198/333
(58) Field of Search ................................ 198/322, 323, 198/325, 326, 332, 333

(56) References Cited

U.S. PATENT DOCUMENTS

| | | | | |
|---|---|---|---|---|
| 2,637,432 A | | 5/1953 | Hohnecker | |
| 3,986,595 A | * | 10/1976 | Asano et al. | 198/333 |
| 4,374,558 A | * | 2/1983 | Saito | 198/333 |
| 4,413,719 A | | 11/1983 | White | |
| 4,800,998 A | * | 1/1989 | Myrick | 198/323 |
| 4,805,757 A | * | 2/1989 | Wilcox | 198/333 |
| 5,083,653 A | * | 1/1992 | Sakata et al. | 198/323 |
| 5,560,468 A | * | 10/1996 | Inoue | 198/333 |
| 5,810,147 A | * | 9/1998 | Vanmoor | 198/323 |
| 6,085,891 A | * | 7/2000 | Behle | 198/333 |
| 6,241,070 B1 | * | 6/2001 | Loder | 198/323 |

FOREIGN PATENT DOCUMENTS

| | | | | | |
|---|---|---|---|---|---|
| EP | 0599452 A1 | * | 6/1994 | 198/323 |
| EP | 0 960 847 A1 | | 12/1999 | |
| JP | 5-97373 | * | 4/1993 | 198/323 |
| JP | 07-144866 | | 6/1995 | |
| JP | 08-012238 | | 1/1996 | |

* cited by examiner

*Primary Examiner*—Douglas Hess

(57) ABSTRACT

A gap monitoring device (16; 19) for monitoring a gap (12) between a tread panel (4) of a passenger conveyor and individual tread elements (2) in a tread elements band of the passenger conveyor, characterized in that a space sensor (18; 34) is provided to measure the gap between the tread panel (4) and at least one tread element (2).

10 Claims, 1 Drawing Sheet

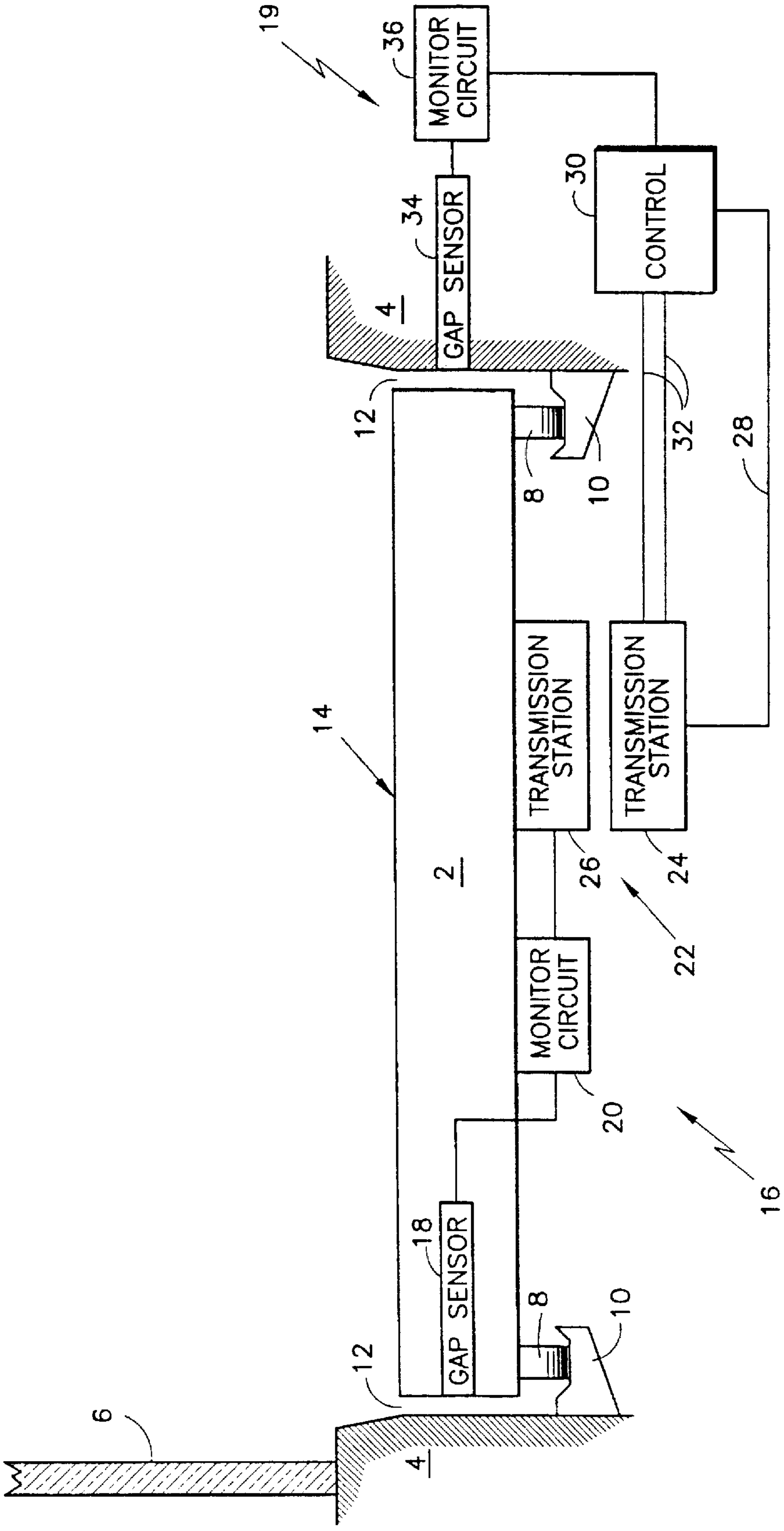
19
36
MONITOR CIRCUIT
34
GAP SENSOR
30
CONTROL
4
12
8
10
32
28
14
TRANSMISSION STATION
TRANSMISSION STATION
2
26
24
22
MONITOR CIRCUIT
20
16
18
GAP SENSOR
8
10
12
6
4

PASSENGER CONVEYOR GAP MONITORING DEVICE

TECHNICAL FIELD

This invention concerns passenger conveyors, i.e. escalators and moving sidewalks, and particularly the control of the gap width between the foot panel of the passenger conveyor and the individual tread elements on the passenger conveyor's tread element band.

BACKGROUND OF THE INVENTION

Depending on whether they are part of an escalator or a moving sidewalk, tread elements are the steps of the step band or the pallets of the pallet band. The individual tread elements move in relation to the stationary lateral skirt or the foot panel. In order to carry out a low abrasion operation, a gap between these parts is unavoidable because of the relative movement between them. However during the operation there is a risk that objects, for example handbags, parts of clothing or the rubber soles of shoes that are particularly endangered because of sliding friction coefficients, can be drawn into this gap and get caught there. The risk is especially great on escalators, since in addition to the horizontal movement of the treads there is also a vertical movement with respect to the foot panel, which clearly increases the risk of capture in the gap.

Due to constructional conditions, the gap can not be as small as desirable. The individual tread elements of the band must have a certain play between them. In turn the tread elements move with laterally attached guiding rollers on lateral rails. A running edge is provided on both sides of the rails which guides the direction of the steps. A stationary forced guidance is not possible for technical reasons. The gap is normally adjusted for a reference measurement of 1.5 to 2.5 mm. Over time the gap size increases due to the unavoidable wear during operation. Safety code requirements establish the maximum size of the gap. For example the European norm EN 115 allows a maximum gap width of 4 mm on one side and a maximum of 7 mm is allowed for the sum of the gaps on both sides of a tread element.

Another issue is that the gap size of each individual tread element is not constant along its moving path but can continuously change for example due to a lateral back and forth movement or "rolling". In addition the gap sizes from tread element to tread element can possibly vary as well. To maintain the respective legal specifications, a regular control of the gap sizes is required during which these gap sizes are measured. This is an expensive undertaking because of the cited potential variations.

To avoid this problem it has been proposed to install a plastic shield on the tread elements, which is spring loaded can be shifted laterally. This device uses spring action to press the plastic shield against the skirt panel and thus closes the gap. A disadvantage is that the plastic shield grinds against the skirt panel and thereby causes undesirable noises. Beyond that the grinding causes the plastic shield to wear and also wears down the metal surface of the skirt panel, for example due to dirt particles which the plastic shield presses against the metal surface. A worn metal surface in turn abrades the plastic shield even more. In addition, many skirt panels include a low friction coating to prevent entrapments, and the wear caused by contact with the plastic shield can degrade or damage this low friction surface.

It is the task of the invention to find a solution which minimizes the required expense of controlling the gaps between tread elements and the skirt panel on passenger conveyors, and does not include the disadvantages connected with the above described device.

SUMMARY OF THE INVENTION

To that end the invention provides a gap width monitoring device which is characterized in that a gap sensor measures the gap width between the skirt panel and at least one tread element. The gap sensor is preferably connected to the passenger conveyor control and sends the gap data to the latter, so that the passenger conveyor drive is automatically switched off when a maximum distance or a maximum gap width is exceeded. Different configurations can be envisioned for the gap sensor. It can be a mechanical probe for example, or a capacitive or inductive gap measuring device. An optical measuring device can also be used, preferably of the type where the reflected backscatter light from a light beam striking the tread element surface at an angle is detected and used to determine the distance. This type of gap width monitoring has the advantage that the passenger conveyor can operate until the maximum gap width is actually exceeded. Thus the inspection intervals are not determined by the need to check the gap widths on a regular basis.

The gap sensor is preferably attached to a tread element of the passenger conveyor so that it measures the gap between this tread element and the foot panel during the operation. In that case it is advantageous to provide a wireless transmission device with a stationary transmission station, and transmission station which is attached to the tread element for transmitting the gap data from the moving tread element to the stationary transmission station. The data transmission can take place for example by using friction contacts, optical methods, particularly in the infrared range, inductive or capacitive means. In conjunction with the gap sensor and the tread element transmission station, it is furthermore especially favorable to provide a storage device for storing the gap data, and to design the tread element transmission station so that it can transmit the stored data to a stationary transmission station when it passes same. Such a stationary transmission station can be located for example in one or in both passenger conveyor reversing areas. On the one hand it can be envisioned to basically detect and evaluate only the maximum values of a run. However a number of values of a run can also be detected and evaluated. It is therefore especially preferred to design the gap width monitoring device so that a position dependent evaluation of the gap width can take place along the course of the tread element's moving path. To that end the sensor can be advantageously connected for example to an integrated monitor circuit which provides the desired data.

The gap width monitoring device is preferably characterized in that a battery is provided to supply current to the components on the tread element side, and the transmission device is designed so that when the tread element transmission station passes the stationary transmission station, it transmits electric power for storage in the battery from the stationary transmission station to the tread element transmission station. The size of the battery can be comparatively small, since current only needs to be stored for a relatively short period of time, for example a whole or half a run. The battery can be an accumulator or a capacitor for example. The current can be transmitted by a friction contact or inductively as well. The latter is particularly preferred if the data transmission is inductive. In that case two different channels can transmit simultaneously in different directions, for example data in one direction and electric power in the other.

Furthermore a gap sensor is preferably provided on each of the opposite sides of the tread element. This allows monitoring both gap widths or the sum of the gap widths. In a first approximation it can also be assumed that the sum of the gap widths does not change significantly due to wear over time. Since this value is specified, a single sensor on one side can also provide the information about the gap widths on both sides. For example with a specified total gap width of 5 mm, the passenger conveyor control must switch off its drive motor if the gap sensor indicates values of 4 mm or greater (exceeding the permissible gap width on the sensor side), or 1 mm and less (falling short of the gap width on the opposite side of the sensor).

On escalator steps it can also occur that when the steps are offset in height with respect to each other during the rise, the gap between the step and the foot panel is different on the tread surface elevation than the gap on the front of the same step in the area where the front of the step meets the elevation of the tread surface of the next lower step. Since this gap width is also significant, it is advantageous to provide a gap sensor there as well, at least on one side.

Another gap sensor is preferably provided on the tread element for measuring the gap width between two neighboring tread element, and even more preferred is providing a deformation sensor on the tread element for measuring the deformation of the tread element due to heavy loads. It is advantageous to couple the respective sensors to the monitor circuit of the gap width monitoring device for transmission to the passenger conveyor control.

At least one stationary gap sensor is preferably provided in the passenger conveyor for measuring the gap between the skirt panel and the tread elements. This allows to determine the gap in regard to each individual tread element in a certain area of the skirt panel, for example an area which experience has shown to be particularly prone to relatively large gaps. In that case it is advantageous to provide means which permit the measured gap values to be precisely assigned to individual tread elements. The individual tread elements can have codes for example which can be detected and identified by the gap sensor, particularly by an optical gap sensor, and the applicable values are assigned to the respective step until the next code is detected.

BRIEF DESCRIPTION OF THE DRAWINGS

The invention will be explained in greater detail in the following by means of an embodiment illustrated by a drawing. The single FIGURE schematically shows a gap width monitoring device on a moving sidewalk in accordance with the present invention.

BEST MODE FOR CARRYING OUT THE INVENTION

The FIGURE shows a palette 2 which is arranged between two skirt panels 4. To better clarify this section of the moving sidewalk, a part of the glass balustrade 6 is illustrated, which is secured to the skirt panel 4 and has a not illustrated guide for the hand rail at the upper end. The shown palette 2 is usually connected at its front and its rear end in the transport direction by a so-called step or palette axis to a preceding or a following palette. The palette axes and/or the palettes have lateral palette support rollers 8 which guide them along the framework of the moving sidewalk by means of corresponding guide rails 10. The interconnected palettes 2 form a so-called palette band. This palette band is enclosed in itself and moves around two deflection chain wheels at the respective ends of the moving sidewalk. The return section of the palette band is generally located under the conveyance area of the palette band.

It is important that the gap width between the tread element, i.e. the palette 2 and the skirt panel 4, is held within the specified tolerance limits in the conveyance area of the palette band. The gap 12 is particularly important between the tread element 14 of the palette 2 and the skirt panel 4 on both sides of the palette 2. The moving path of the palettes 2 in the conveyance area of the palette band is adjusted during the installation, for example by adjusting the guide rails 10 and the support rollers 8, so that the normal gap width is about 1.5 to 2.5 mm. To monitor this gap width during operation, a gap width monitoring device 16 is installed on the palette 2 and/or a gap width monitoring device 19 is installed on the skirt panel 4.

The gap width monitoring device 16 on the palette 2 has a gap sensor 18, a monitor circuit 20 and a transmission device 22 which are interconnected. The monitor circuit 20 can have a microprocessor and a memory, for example a RAM memory which stores the maximum and the minimum gap of a step while it passes through the conveyance area of the palette band. The transmission device 22 comprises a stationary transmission station 24 and a transmission station 26 which moves with the palette 2. The stationary transmission station 24 is installed for example in one of the reversing areas of the palette band. The gap data stored in the monitor circuit 20 are transmitted to the stationary transmission station 24 when the palette's fixed transmission station 26 passes the latter. The stationary transmission station 24 sends the gap data to the control 30 via a data line 28. When a specified maximum distance of the gap width is exceeded, the control switches the moving sidewalk drive off. Before the moving sidewalk can be restarted the customer service department must check the gap width and possibly carry out a moving sidewalk maintenance service.

The sensor 18 can be a mechanical, optical, capacitive or inductive sensor with a measuring range of about 0 to 5 mm and a resolution of at least 0.5 mm, but preferably smaller, i.e. down to 0.3 or 0.1 mm. Such a gap width monitoring device 16 can be installed on only one but also on several palettes, and in an extreme case even on all of the palettes. If it is assumed that the total gap width of the sum of both lateral gaps 12 does not change significantly due to wear, it can be assumed that no significant wear takes place at the skirt panels 4 and laterally at the palettes 2, and therefore the measurement of the gap width on one side of the palette 2 can be sufficient. The gap width on the other side can easily be determined by differentiation. It is however preferred to monitor the gap 12 on both sides of a palette.

A storage accumulator or a storage capacitor is provided to supply power to the electrical components of the gap width monitoring device 16 on the palette 2, and is also recharged by the transmission device 22 when it passes the stationary transmission station 24. However it can also be envisioned to provide a separate transmission device for charging the battery. Another configuration which operates with a heavily capacitive storage accumulator can be imagined, and is only charged for example during moving sidewalk down-time. The power is supplied by power supply lines 32 from the escalator control 30 to the stationary transmission station 24. The transmission of information and/or power can take place in a transmission station 22 for example through friction contacts or inductively as well.

The gap width monitoring device 16 installed on the palette 2 essentially detects the gap width between this palette 2 and the skirt panel 4 along the entire conveyance range of the palette 2. This gap width monitoring device 16 is unable to provide direct statements about whether the gap width of other palettes 2 is or is not within the tolerances. A gap width monitoring device 16 is installed on the right skirt panel 4 of the FIGURE, where the gap sensor 34 installed at a predetermined place of the skirt panel 4 detects and monitors the gap width of all passing palettes 2. The gap sensor 34 advantageously supplies its data also to the moving sidewalk control 30 via a monitor circuit 36. The supply of power to this gap width monitoring device 19 can also take place via the moving sidewalk control 30 or via another power source. Aside from that the gap width monitoring device 19 is basically very similar to the gap width monitoring device 16 and can also supply similar data to the moving sidewalk control. The gap sensor 34 can be designed for example to detect a code on the individual palettes 2, which is different for each palette 2, so that the gap information can be assigned to individual palettes 2, which clearly simplifies any service in case the moving sidewalk is switched off. In a similar way the gap data determined by the gap width monitoring device 16 on the palette 2 can be linked to the time that has elapsed since the last passing of the stationary transmission station 24, so that the gap data can be correlated with a special area of the foot panel. Similarly to the preceding arrangement, instead of the time linkage the different areas of the skirt panel can of course be provided with a code for correlation of the detected gap data.

To effectively monitor the gap width of all palettes 2 in the conveyance range of the palette band, it is advantageous for example to combine a gap width monitoring device 16 installed on a palette 2 with another gap width monitoring device 19 installed on the foot panel 4 of the passenger conveyor. These data can be transmitted to an evaluation unit for example, which combines them and provides a total picture of the gap widths along the conveyance path.

A gap width monitoring device 16, 19 can either send the measured gap data to the moving sidewalk control 30, or produce a switch-off signal only in case a maximum gap width has been exceeded, and send it to the moving sidewalk control 30. This requires that the microprocessor of the monitor circuit is designed and programmed accordingly. Particularly the gap width monitoring device 16 installed on a palette 2 can be provided with other sensors, for example to detect the gap of two consecutive palettes 2 or to detect the palette load, and also to switch the moving sidewalk off when a predetermined maximum value has been exceeded there.

The above statements with respect to moving sidewalks also apply to the steps of escalators. With escalator steps it is also advantageous to provide a sensor to monitor the gap width in the area of the tread surface 14, which measures the gap width on the front of the step with respect to the following lifted step, approximately at the tread surface 14 elevation of the following step.

What is claimed is:

1. A passenger conveyor including a skirt panel (4) and a tread element band including a plurality of tread elements (2) and having a gap (12) between the skirt panel (4) and the individual tread elements (2), the passenger conveyor further including a gap width monitoring device (16, 19) for monitoring the gap (12) between the skirt panel (4) and the individual tread elements (2), wherein the gap width monitoring device (16, 19) is adapted to measure a width of the gap (12) during normal operation of the passenger conveyor.

2. The passenger conveyor as claimed in claim 1, wherein the gap width monitoring device (16, 19) includes a tread gap sensor (18) and a wireless transmission device (22), the tread gap sensor (18) being adapted to be installed on a tread element (2) of the passenger conveyor to measure the distance between this tread element (2) and the skirt panel (4) during operation, and the wireless transmission device (22) including a stationary transmission station (24) which is adapted to be stationary on the passenger conveyor and a movable transmission station (26) which is adapted to be installed on the tread element (2) and connected to the tread gap sensor (18) to receive data captured by the tread gap sensor (18), the movable transmission station (26) being designed to transmit the received gap data to the stationary transmission station (24).

3. The passenger conveyor as claimed in claim 2, further comprising a storage device (20) for storing gap data provided in connection with the tread gap sensor (18) and the movable transmission station (26).

4. The passenger conveyor as claimed in one of claims 2 or 3, wherein the gap width monitoring device makes a position-dependent evaluation of the gap width along the moving path of the tread element.

5. The passenger conveyor as claimed in one of claims 2 or 3, further comprising a battery provided to supply power to the consumers on the tread element side, wherein the transmission device (22) is designed so that electric power to be stored by the battery is transmitted from the stationary transmission station (24) to the movable transmission station (26) when the movable transmission station (26) passes the stationary transmission station (24).

6. The passenger conveyor as claimed in one of claims 2 or 3, whereinone of the tread gap sensors (18) is adapted to be installed at each of opposite ends of the tread element (2).

7. The passenger conveyor as claimed in one of claims 2 or 3, further comprising another gap sensor adapted to be installed on the tread element (2) to measure the gap width between two neighboring tread elements (2).

8. The passenger conveyor as claimed in one of claims 2 or 3, further comprising a deformation sensor adapted to be installed on the tread element (2) to measure the tread element deformation due to heavy loads.

9. The passenger conveyor as claimed in one of claims 1 to 3, wherein the gap width monitoring device (16, 19) includes a panel gap sensor (34) which is adapted to be stationary on the passenger conveyor to measure the gap between the skirt panel (4) and tread elements (2).

10. The passenger conveyor as claimed in claim 9, wherein the gap width monitoring device (16, 19) assigns the detected gap data to individual tread elements (2).

* * * * *